United States Patent [19]

Emery

[11] Patent Number: 4,974,554
[45] Date of Patent: Dec. 4, 1990

[54] COMPOUND ROD, SLEEVE AND OFFSET CRANKSHAFT ASSEMBLY

[76] Inventor: Lloyd H. Emery, 9986 Blackberry La., Great Falls, Va. 22066

[21] Appl. No.: 400,583

[22] Filed: Aug. 17, 1989

[51] Int. Cl.$^5$ .............................................. F02B 75/04
[52] U.S. Cl. ............................ 123/48 B; 123/197 AB; 92/139
[58] Field of Search ................. 123/197 AB, 197 AC, 123/58 R, 59 R, 48 B, 78 E; 92/139, 165

[56] References Cited

U.S. PATENT DOCUMENTS

| | | | |
|---|---|---|---|
| 1,471,847 | 10/1923 | Holliday | 123/61 R |
| 2,057,158 | 10/1936 | Moffitt | 92/139 |
| 2,074,581 | 3/1937 | Frye | 92/139 |
| 2,104,802 | 1/1938 | Hansen | 123/197 AB |
| 2,252,987 | 8/1941 | Schniekart | 92/139 |
| 2,463,174 | 3/1949 | Hasselberg | 123/197 AC |
| 2,602,288 | 7/1952 | Rinia et al. | 123/48 R |
| 2,956,738 | 10/1960 | Rosenschold et al. | 92/165 |
| 3,034,362 | 5/1962 | Caddell | 123/197 AB |
| 4,807,577 | 2/1989 | Koutsoupidis | 123/197 AC |

FOREIGN PATENT DOCUMENTS

| | | | |
|---|---|---|---|
| 833509 | 10/1938 | France | 92/139 |
| 558337 | 2/1957 | Italy | 92/139 |

Primary Examiner—David A. Okonsky

[57] ABSTRACT

A compound rod, sleeve and an offset crankshaft assembly for post crankshaft top dead center-top dead center piston assembly is invented for an internal combustion engine and other machines. The piston includes a crown or head and a skirt and is connected to a first connecting rod by a second connecting rod. A separate sleeve is provided and attached to the linkage by the first connecting rod. The piston and the sleeve are kinematically linked to each other and to the crankshaft of the engine by the two connecting rods, so that the piston crown or head is raised to a maximum elevation after the top dead center of the crankshaft rod journal which occurs during the compression stroke and exhaust stroke of the piston. The second connecting rod is connected to the crankshaft of the engine by the first connecting rod. The purpose of this invention is to greatly increase the mechanical and input/output efficiencies of an engine (internal or external combustion) by providing for an increased effective moment arm offered by the crankshaft rod journal during the period of peak combustion pressure.

5 Claims, 9 Drawing Sheets

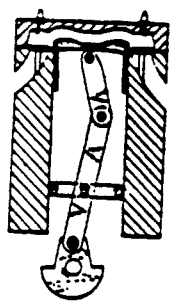 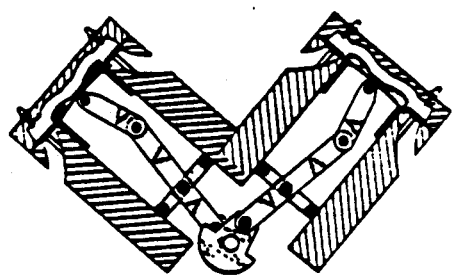
Figure 7  Figure 8
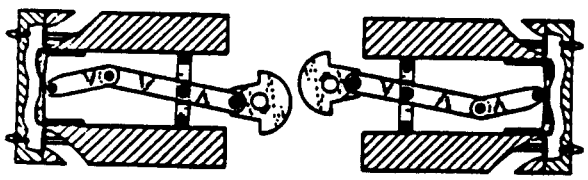
Figure 9
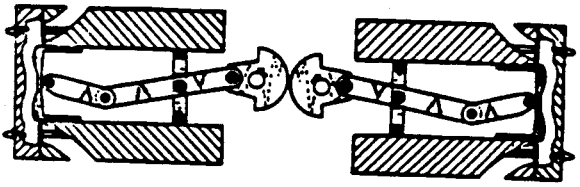
Figure 10

COMPOUND ROD, SLEEVE AND OFFSET CRANKSHAFT ASSEMBLY

BACKGROUND OF THE INVENTION

1. Field of the Invention

The invention relates to a compound connecting rod, sleeve and offset crankshaft assembly that causes the top dead center of the piston crown to occur after the top dead center of the crankshaft rod journal during the compression and exhaust strokes of the piston.

2. Description of the Relevant Art.

Numerous types of compound pistons, i.e., pistons having a plurality of linked movable elements within each cylinder of the engine block, have been developed for internal combustion engines. In some of these prior art configurations, the top of the piston, i.e., the crown or head of the piston, is only partially extended at the upper end of the crankshaft stroke. The maximum amount of compression, i.e., the maximum extension of the telescoping members, occurs when the crank throw is past dead center. The complication of most of these expanding piston/rod/cranksaaft assemblies is sufficient to burden their production with excessive production and maintenance costs. In some of the prior art, the two halves of an expanding piston telescope as the piston moves up and then again as the piston moves down. Other expanding pistons reach top dead center at the same time as the crankshaft throw reaches top dead center and the piston crown also reaches its maximum distance from the crankshaft throw when the crankshaft throw is at the top and bottom dead center positions. Among the prior art relative to expanding pistons and other devices having linkage systems which relatively move the pistons, as the connecting rod moves up and down, may be mentioned U.S. Pat. Nos. 1,379,115; 1,420,236; 1,430,491; 1,671,708; 2,368,412; 2,458,111; 3,034,362; 3,859,976; 3,908,623 and 4,203,406.

SUMMARY OF THE INVENTION

1. Purpose of the Invention

It is an object of the present invention to provide an improved compound connecting rod, sleeve and offset crankshaft assembly for an internal combustion engine, air pump and similar devices employing crankshafts, rods and pistons.

Another object is to provide a compound connecting rod, sleeve and offset crankshaft assembly in which the crown or head of the piston is raised to a maximum elevation after the top dead center of the crankshaft rod journal during the exhaust and compression strokes of the piston.

A further object is to provide a compound connecting rod, sleeve and offset crankshaft assembly which results in greater mechanical and thermodynamic efficiency of an internal combustion engine, air pump or similar device using crankshafts, rods and pistons.

An additional object is to provide a compound rod, sleeve and offset crankshaft assembly which is capable of achieving either less than, equal to, or greater than, compression after the upper end (top dead center) of the crankshaft rod journal stroke as measured on the cylinder centerline.

Still another object is to provide a compound rod, sleeve and offset crankshaft assembly which, when installed in a cylinder of an engine block of an internal combustion engine, air pump or similar reciprocating crankshaft device, results in the generation of a greater amount of power and torque per unit amount of fuel consumed and increased thermodynamic and mechanical efficiency.

Another object of this invention is to provide a compound rod, sleeve and offset crankshaft assembly with such dimensions and ratios such that the peak combustion pressures occur when the effective moment arm of the crankshaft rod journal throw is maximized to provide a maximum amount of engine torque per engine cycle.

These and other objects and advantages of the present invention will become evident from the description which follows.

2. Brief Description of the Invention

In the present invention, the device constitutes an arrangement for reducing cylinder head space after top dead center of the crankshaft rod journal throw, thereby allowing the top dead center of the piston to occur after the top dead center of the crankshaft rod journal throw, thereby greatly increasing the moment arm presented by the crankshaft rod journal throw at the moment of combustion and peak combustion pressures, thereby greatly increasing the resultant torque production by the crankshaft. This is accomplished by providing a compound rod (two connecting rods) and one piston and one separate sleeve all connected to an offset crankshaft (the crankshaft main being centerline is displaced from the cylinder bore centerline in the general direction of tangential motion of the rod journal at bottom dead center of the crankshaft rod journal throw). That is, the crankshaft centerline will be offset into the area occupied by the second and third circle quadrants of rotation of the normal and original crankshaft location which are bounded by the 90 degree and 270 degree rotation points. The resultant motion of the compound rod, sleeve and offset crankshaft assembly results in the combustion chamber experiencing less compression at the top dead center point of the crankshaft throw rod journal, when compared to the combustion chamber compression experience at the point of crankshaft rod journal throw top dead center for a comparable engine as commonly seen in all current internal combustion engines. The actual combustion chamber compression space experienced at each point during the compression stroke of the piston and the following power stroke is totally dependent, and a function of, the rod lengths and pivot points of the two connecting rods, piston pin location, sleeve pin location and the offset crankshaft location. The piston head or crown is lowered relative to the sleeve during the first part of the power stroke of the piston, and is raised to another maximum relative to the sleeve during the second part of the power stroke of the piston.

In general, the present invention entails a compound rod, sleeve and offset crankshaft assembly for an internal combustion engine, or similar device, having an engine block with at least one cylinder in the block. The piston is disposed in the cylinder and has a crown or head and a skirt. The piston skirt is generally integral with the piston crown but does not have to be. A sleeve is provided within the cylinder, with the sleeve cooperating with the piston skirt and crankshaft, i.e., the piston skirt and the sleeve are kinematically linked to each other by a second connecting rod and part of the first connecting rod. The sleeve is connected to the offset crankshaft of the engine by the second part of the first connecting rod. In this manner, the piston crown is raised to a maximum elevation within the cylinder bore after both the end (top dead center) of the compression stroke of the crankshaft throw rod journal and after the end (top dead center) of the exhaust stroke of the crankshaft throw. Because of the contemplated kinematic relationship, the piston crown and skirt are lowered to a lower elevation relative to the sleeve during the first portion of the work stroke and intake stroke of the piston. The sleeve is directly connected to the offset crankshaft by the second part of the first connecting rod, with a pivotal wrist pin connection between the first connecting rod and the sleeve.

The preferred kinematic linkage between the piston and the sleeve entails the provision of a second connecting rod connected to the end of the first connecting rod by a wrist pin arrangement or bearing. The first connecting rod extends from the crankshaft and beyond the wrist pin in the sleeve to a terminus. The first wrist pin pivotally connects the first connecting rod to the sleeve. A second wrist pin pivotally connects the terminus of the first connecting rod to one end of a second connecting rod. A third wrist pin or bearing pivotally connects the other end of the second connecting rod to the piston; typically the terminus end of the first connecting rod is pivotally connected to the skirt of the piston directly by a wristpin.

The piston rings, if any, are placed parallel to each other, perpendicular to and on the piston skirt.

The present invention provides several salient advantages. Top dead center of the piston occurs after the top dead center (point of maximum elevation of the crankshaft rod journal in the cylinder bore) of the crankshaft rod journal stroke, thereby providing an increased effective moment arm of the crankshaft rod journal throw at the moment of combustion and maximum cylinder pressure. Since the effective moment arm of the crankshaft rod journal throw is longer during the initial combustion period when maximum cylinder pressure is experienced, the resultant torque and thus the mechanical and thermodynamic efficiency of the internal combustion engine, or similar device, is increased. Finally, the present compound rod, sleeve and offset crankshaft assembly, when installed in a cylinder of an engine block of an internal combustion engine, results in the generation of a greater amount of power per unit amount of fuel consumed.

The invention accordingly consists of the construction, combination of elements and arrangement of parts which will be exemplified in the compound rod, sleeve and offset crankshaft assembly hereinafter described and of which the scope of application will be indicated in the appended claims.

BRIEF DESCRIPTION OF THE DRAWINGS

In the accompanying drawings are shown several of the various possible embodiments of the invention:

FIGS. 1–4 are rotated 90 degrees along the cylinder bore axis.

FIG. 7 is a sectional view of one embodiment of the invention when the offset crankshaft, sleeve and compound connecting rod linkage is used in an inline engine.

FIG. 8 is a sectional view of one embodiment of the invention when the offset crankshaft, sleeve and compound connecting rod linkage is used in a V configuration engine.

FIG. 9 is a sectional view of one embodiment of the invention when the offset crankshaft, sleeve and compound connecting rod linkage is used in an opposed cylinder arrangement engine.

FIG. 10 is a sectional view of one embodiment of the invention when the offset crankshaft, sleeve and compound connecting rod linkage is used in another form of opposed cylinder arrangement engine.

DETAILED DESCRIPTION OF THE PREFERRED EMBODIMENTS

Figure 1:
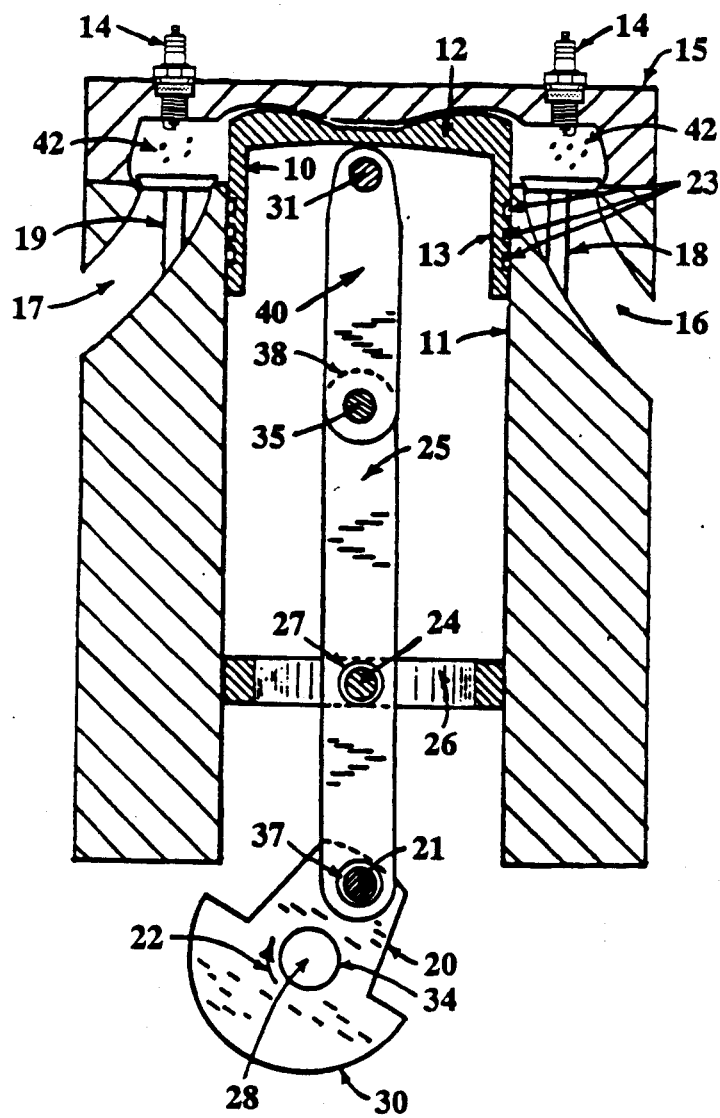
FIG. 1 is a sectional view of one embodiment of the invention when the piston head is at the top dead center position and the rod journal throw of the offset crankshaft is past top dead center and the connecting rod linkage is in vertical alignment.

Referring now to FIGS. 1, 2, 3, 4, 5, 7, 8, 9, 10, 11 and 12 a piston 10 is coaxially disposed within a cylindrical cylinder 11 of the engine block of an internal combustion engine, with the wall of cylinder 11 concentrically surrounding the piston 10. The piston 10 is provided with a crown or head 12 and a skirt 13, with the skirt 13 being integral with the crown. Two spark plugs, 14 are mounted in the head or top 15 of the cylinder 11, and an intake port 16 and an exhaust port 17 are provided in the cylinder block adjacent the top 15 of the cylinder 11. The intake valve 18 and exhaust valve 19 are provided. As shown in FIG. 1, the piston 10 is at top dead center of the compression stroke of the piston and the crankshaft rod journal throw 20 is in an intermediate position between TDC and BDC for the power stroke of the offset crankshaft, and the offset crankshaft 28 is rotating as indicated by arrow 22, FIG. 1. The intake valve and the exhaust valve are closed. A plurality of parallel piston rings 23 are disposed about the periphery, in this case the perimeter, of the piston skirt 13 adjacent the piston crown or head 12 of the piston 10.

In accordance with the present invention, the kinematic linkage contemplated is composed of an offset crankshaft, two connecting rods and a sleeve arranged with certain linkage ratios which will now be described. A first wrist pin 24 pivotally connects a first connecting rod 25 to the sleeve 26. A bushing 27 is provided between the first wrist pin 24 and the connecting rod 25.

Figure 5:
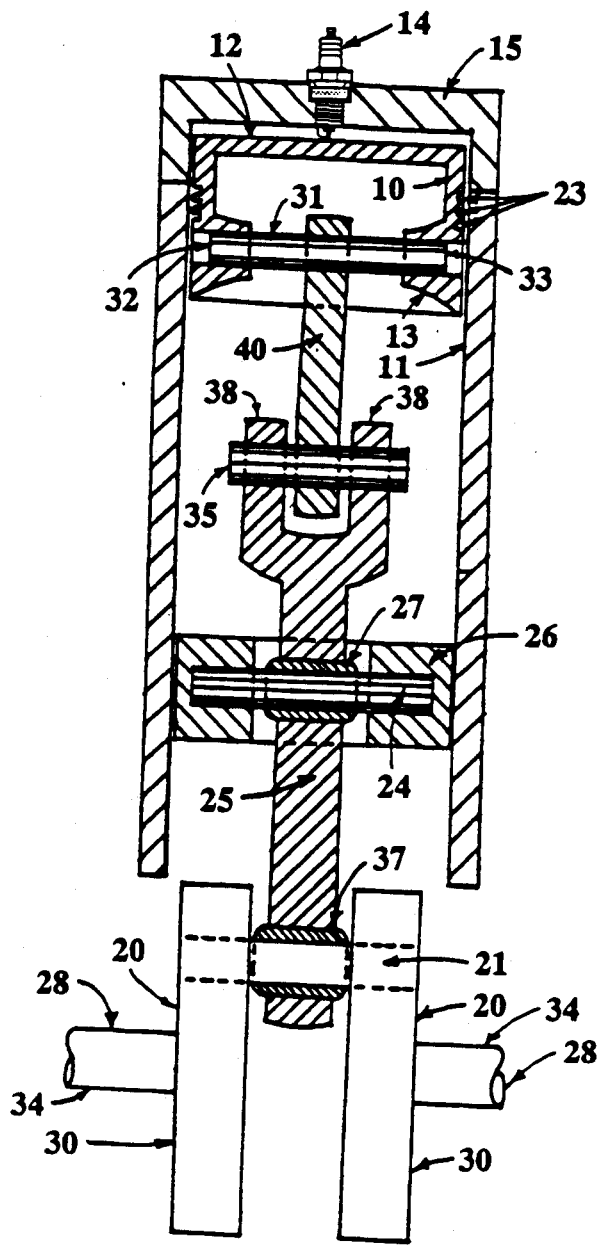
FIG. 5 is a sectional view of one embodiment of the invention when

The connecting rod 25 extends from a pivotal connection 21, which connects the rod 25 via a bearing 37 to an offset crankshaft 28 via a rod journal throw 20. A counterweight 30, or in this case a pair of counterweights 30, FIG. 5 are part of the offset crankshaft 28 to provide crankbalanced rotation of the assembly and thus to prevent eccentric stress on the main bearing journal 34. The crankshaft 28 main bearing saddles or bores are align bored off center from the center line of the cylinder 11 bore, in either direction when necessary, but to the left as viewed in FIG. 1. The first connecting rod 25 extends to a terminus 38 having a terminal connection about a second wristpin or bearing 35. The wrist pin 35 pivotally connects the terminus 38 of the first connecting rod 25 to one end of the second connecting rod 40. The other end of the second connecting rod 40 is pivotally connected via a third wrist pin 31 to the piston 10, typically to the skirt 13 as best shown in FIG. 5, in which the ends 32 and 33 of the wrist pin 31 fit into recesses or sockets in the inner surface of the piston skirt 13. Similar mounting of the wrist pin 24 to the sleeve 26 is provided as best shown in FIG. 5.

Figure 2:
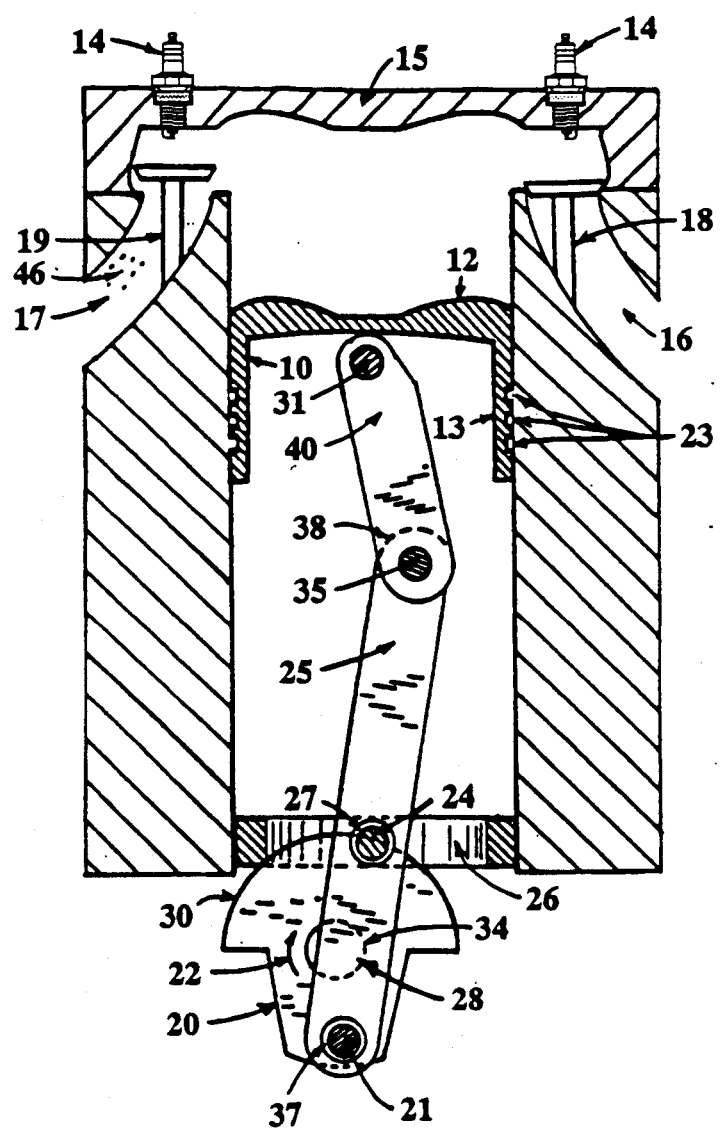
FIG. 2 is a sectional view of one embodiment of the invention when the rod journal throw of the offset crankshaft is at the bottom dead center position.
Figure 3:
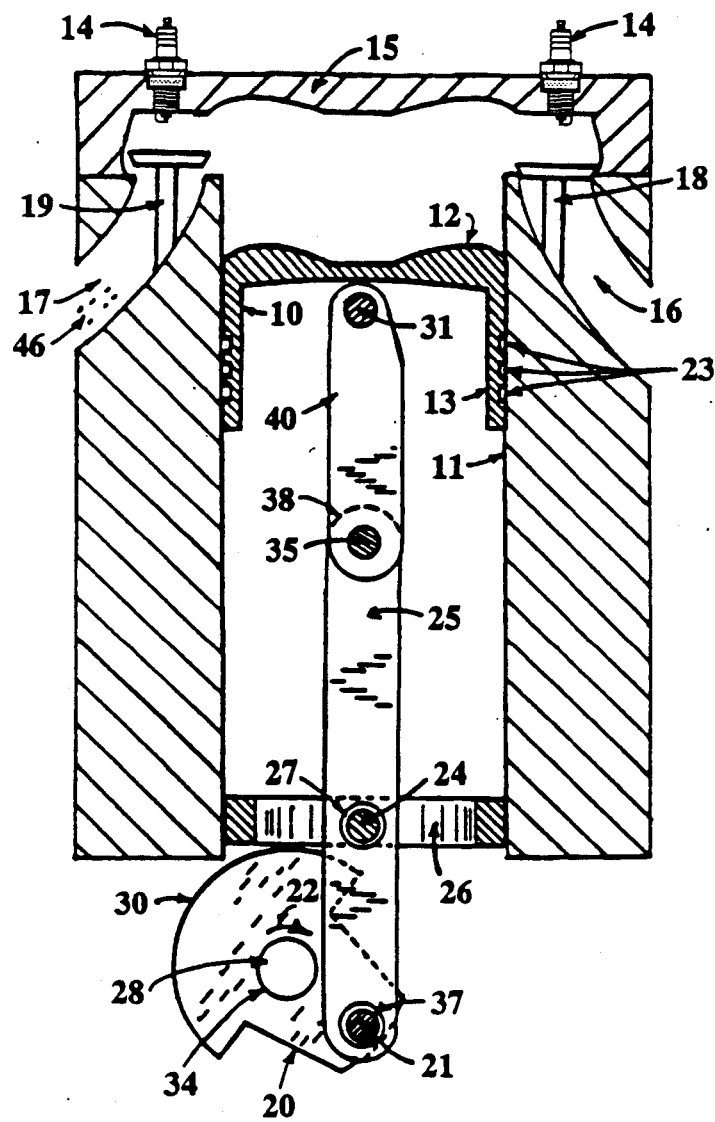
FIG. 3 is a sectional view of one embodiment of the invention when the connecting rod linkage is in the vertical alignment position near bottom dead center of the piston.
Figure 4:
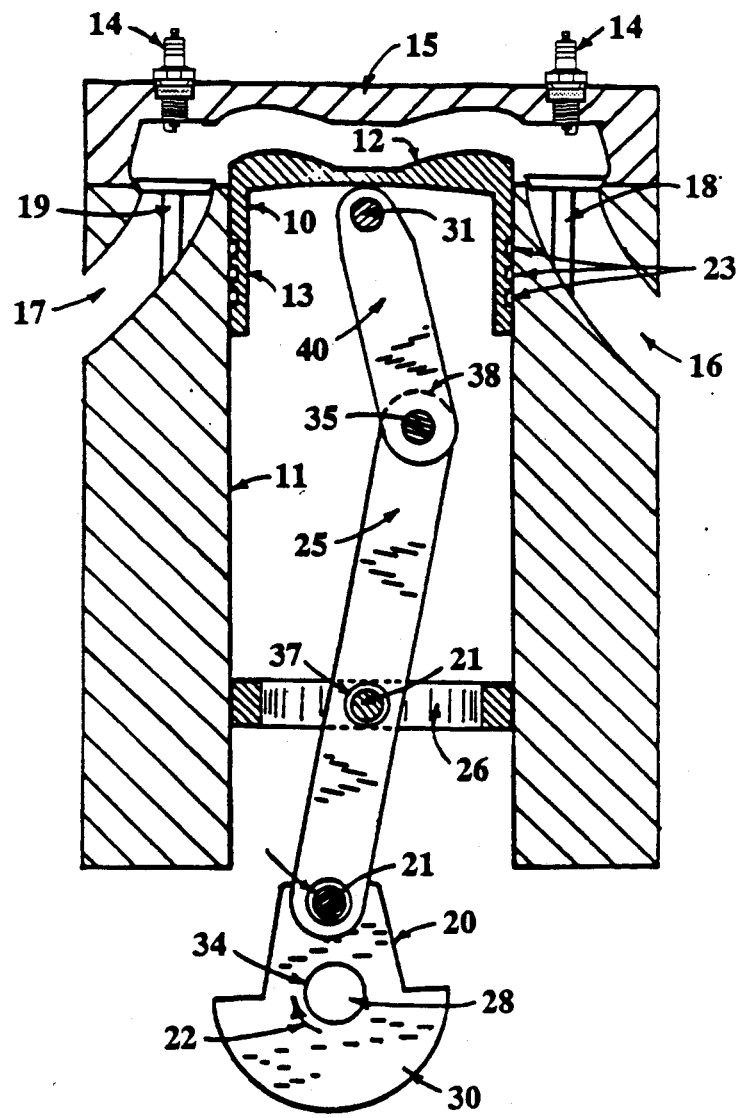
FIG. 4 is a sectional view of one embodiment of the invention when the rod journal throw of the offset crankshaft is at the top dead center position.

The invention kinematic linkage, as is evident from the foregoing discussion, moves the elements 30, 28, 21, 25, 24, 26, 38, 35, 40, 31, 10 and 12 in conjunction, so that as is evident from FIGS. 1, 2, 3, 4 and 5, as the crankshaft 28 is rotated by the piston 10 in a cylical manner the piston crown 12 is raised to a maximum elevation after the end (top dead center) of the compression stroke of the rod journal 21, FIG. 1, and after the end of the exhaust stroke of crankshaft rod journal throw (top dead center). At the end of the compression stroke the fuel and air charge 42 is ignited by the firing of the spark plugs 14. The piston crown reaches a minimum elevation at the end of the expansion stroke of the piston 10 at which time the exhaust gas stream 46 is beginning to be discharged via exhaust port 17. FIGS. 1, 3 and 5 show elements 40 and 25 in a rectilinear orientation. FIG. 3 shows the piston crown 12 during the latter part of the power (expansion) stroke in the cylinder bore 11. FIG. 4 and FIG. 2 show the crankshaft rod journal throw 20 at its highest (top dead center) and lowest (bottom dead center) elevations, respectively in the cylinder bore 11. FIGS. 1, 3 and 5 show elements 40 and 25 in rectilinear orientation, and it is apparent from examining both the FIGS. 2 and 4 dispositions of the respective elements, that the crown 12 is not raised to a maximum elevation in the engine cylinder bore 11 when the crankshaft rod journal 21 is at the bottom and top dead center positions respectively. FIG. 1 shows the elements 25, 40 producing the top dead center of the compression stroke of the piston with force being exerted against the piston crown 12 by the intake charge of air and fuel within the combustion chamber defined by cylinder 11, cylinder head 15, and piston crown 12 and valves 18 and 19. The compression force is also being applied to the offset crankshaft 28 through the rod journal 21, which is past top dead center, across a maximized moment arm determined by the linear displacement of the crankshaft rod journal 20 past the point of crankshaft rod journal top dead center. The condition in FIG. 1 at the end of the compression stroke of the piston, but after the top dead center of the crankshaft rod journal 21, is different from all other internal combustion engines in that the point of maximum compression, top dead center of the piston crown 12 and top dead center of the crankshaft throw 20, do not occur at the same point or degree of offset crankshaft 28 rotation in this invention, as they do in all other engines. At the moment of combustion, a period of time before, during and after top dead center of the piston crown 12, FIG. 1, the compression force as well as the combustion force on the piston crown 12 is transferred through the crankshaft rod journal throw 20 which is in a more advantageous position with respect to torque production due to a much larger positive work moment arm during the final stages of compression, the initial stages of combustion and periods of highest combustion chamber pressures as compared to normal engines. All other known engines experience top dead center of the piston crown 12 and top dead center of the crankshaft rod journal throw 20 at the same point in time.

The ratios of the distances separating the wristpins and rod bearing as well as the crankshaft throw length (one-half crankshaft stroke) are crucial to the success of this invention. In order for this invention to work best, the distance between the centerlines of wristpin 24 and wristpin 35 must exceed the distance between the centerline of wristpin 24 and centerline of crankshaft rod journal 21. The invention will also work if this is not the case providing that the distance between the centerlines of wristpins 31 and 35 is very much shorter than the distance between the centerlines of wristpin 35 and 24. However, the preferred embodiment is for the distance between the centerlines of wristpins 24 and 35 to exceed the distance between wristpin 24 and the centerline of crankshaft rod journal 21.

Figure 13:
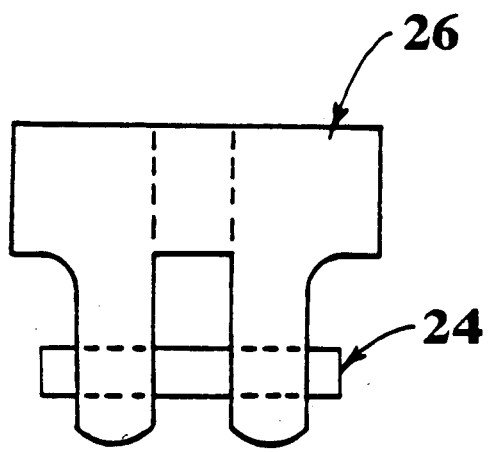
FIG. 13 is a sectional view of one alternative embodiment of the invention sleeve when the sleeve wristpin is below the horizontal midpoint of the sleeve.

FIG. 13 is a sectional view of an alternative embodiment of the invention sleeve when the sleeve wristpin is below the horizontal sleeve center point The main reason one might want to employ this alternative embodiment sleeve is to shorten the overall length of the two connecting rods and sleeve linkage that connects the piston to the offset crankshaft.

Figure 6A:
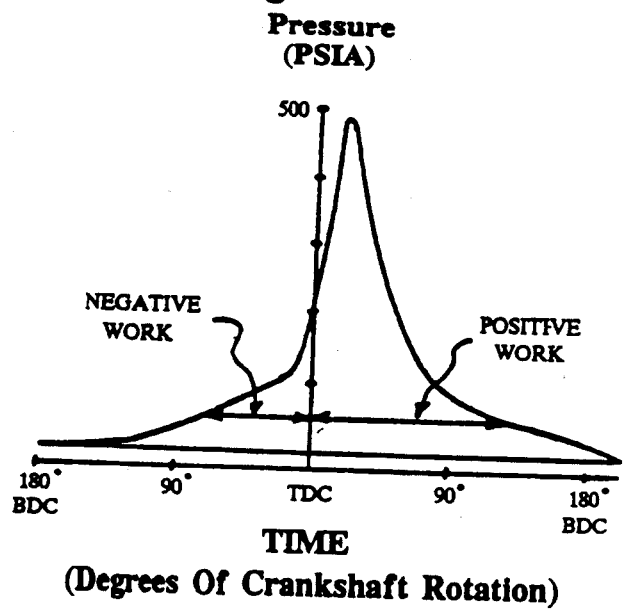
FIGS. 6A and 6B are pressure-time diagrams of a typical spark ignition engine at wide-open throttle (a) and when the compound rod, sleeve and offset crankshaft linkage is used (b).
Figure 6B:
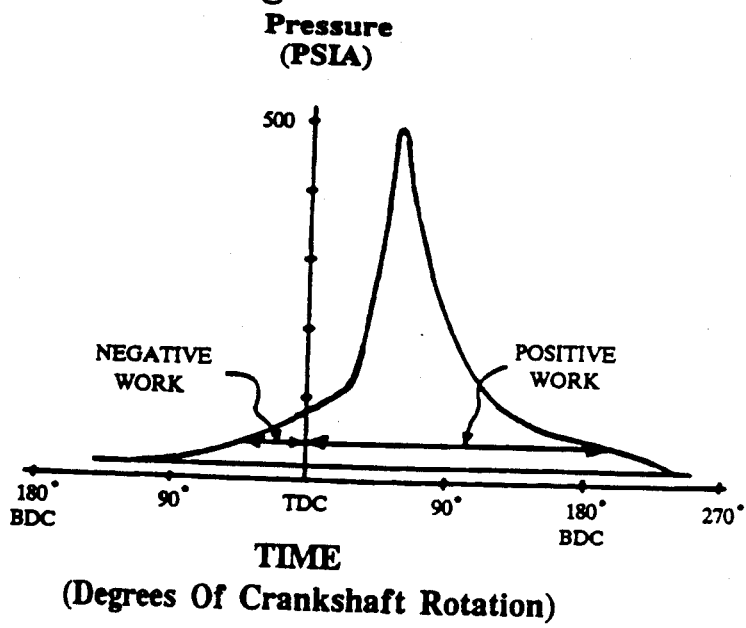
Figure 11:
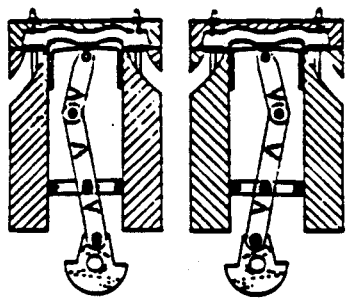
FIG. 11 is a sectional view of one embodiment of the invention when the offset crankshaft, sleeve and compound connecting rod linkage is used in a twin vertical cylinder arrangement engine.
Figure 12:
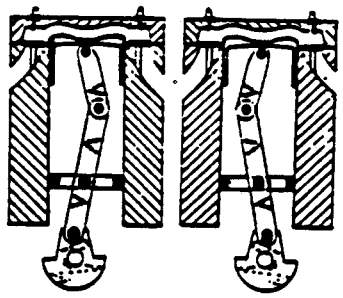
FIG. 12 is a sectional view of one embodiment of the invention when the offset crankshaft, sleeve an compound connecting rod linkage is used in another form of a twin vertical cylinder arrangement engine.

FIG. 6A is a pressure-time diagram of a typical spark ignition engine at wide-open throttle FIG. 6B is and when this invention of properly ratioed comPound (TWO) connecting rods, separate sleeve and offset crankshaft linkage is used in. Examination of FIG. 6A shows a significant amount of negative work being performed before the top dead center of the piston and crankshaft (some rotation point in normal spark ignition engine, diesel engine, etc.) to compress the air and fuel vapor and to contain the pressure generated by the initial stages of ignition. Examination of FIG. 6.A also reveals that the peak combustion chamber pressure occurs at approximately 17 degrees past top dead center. Since the maximum moment arm of the crankshaft rod journal throw occurs at 90 degrees after top dead center, one can easily believe that maximum mechanical efficiency is not occurring here in FIG. 6A.

In FIG. 6B, however, the use of this invention has effected an improvement on the mechanical efficiency of the same engine. The negative work performed by the engine in FIG. 6B to compress the air and fuel vapor and to contain the combustion pressures during the initial stages of combustion is considerably less because a greater portion of the compression and ignition pressure occurs at crankshaft rotations past top dead center of the crankshaft rod journal throw due to the use of this invention. This invention also causes the peak combustion pressure to occur at more advantages crankshaft rotation angles (angles closer to 90 degrees past top dead center of the crankshaft rod journal throw), thus producing a greater rotational torque output of the engine for the same combustion pressures.

Of course, the invention could cause some negative work at the end of the expansion stroke of the piston, however, this negative work can be minimized by cam timing changes to minimize cylinder pressures at this point which would facilitate the usefulness of the invention.

The use of this invention reduces head space at the end of the compression stroke of the piston which is a number of degrees of crankshaft rotation, ≧1 degree, past the point of top dead center of the crankshaft rod journal 21 or rod bearing surface 21, whereby the maximum compression ratio is achieved at a point past the crankshaft rod journal top dead center position (in the 1 degree to 90 degree PTDC area), FIG. 1. This results in an engine design that will minimize the destructive effects of spark knock and preignition and will increase the fuel efficiency and mechanical efficiency of the engine. Bearing wear is reduced and the maximum downward force on the main bearing caps is also reduced. Thus, more of the combustion force is converted to crankshaft rotational torque. This invention is useful with reciprocating internal combustion engines of all types, e.g., spark ignition and compression ignition engines, 2-cycle and 4-cycle engines, engines which use a combustible charge of air mixed with fuel and engines which use solid injected fuel and engines using various thermodynamic cycles, such as the Otto and Diesel.

This invention provides a compound connecting rod with a sleeve and an offset crankshaft assembly which is well adapted to meet the conditions of standard manufacturing practice and practical use.

Since various possible embodiments might be made of the above invention such as FIGS. 7-13, and since various changes might be made in the embodiments above set forth, and since the direction of crankshaft angular rotation can be reversed, and since the wrist pins do not have to be on the cylinder centerline, and since the distance of separation between the wristpins can change, it is to be understood that all matter herein described or shown in the accompanying drawings is to be interpreted as illustrative and not to be considered in a limiting sense. Thus, it will be understood by those skilled in the art of internal combustion engines that although the preferred and alternative embodiments have been shown and described in accordance with the Patent Statutes, the invention is not limited thereto or thereby.

What is claimed is:

1. An offset crankshaft assembly comprising:
   (a) an internal combustion engine block with at least one cylinder in said block and a cylinder head,
   (b) an offset crankshaft located in the block in which the crankshaft main bearings are located in an offset position relative to the cylinder bore centerline,
   (c) a first connecting rod, pivotally connected to a sleeve intermediate the length of the first connecting rod, which connects a rod journal of the offset crankshaft to a bottom end of a second connecting rod,
   (d) said sleeve connected to the first connecting rod by a bearing means,
   (e) said second connecting rod connects a piston to the first connecting rod, said second connecting rod being connected to said first connecting rod using bearing means,
   (f) said piston connected to the second connecting rod by a bearing means.

2. The offset crankshaft assembly of claim 1 wherein the piston is kinematically linked to the offset crankshaft via said two connecting rods in series, such that, the piston crown is raised to a maximum elevation in the cylinder bore (top dead center) after top dead center of the crankshaft rod journal.

3. The offset crankshaft assembly of claim 1, wherein a ratio of, distances connecting pivot points of the offset crankshaft linkage are in such a relationship that the piston crown has an upward motion, acceleration and velocity toward the cylinder head as the crankshaft rod journal has a downward motion, acceleration and velocity away from the cylinder head for a period of time after top dead center of the crankshaft rod journal, such that, the piston crown may or may not achieve top dead center after the crankshaft rod journal top dead center.

4. The offset crankshaft assembly of claim 1, wherein one or more parallel piston rings are provided about the periphery of the piston skirt, said parallel piston rings being disposed around the piston skirt below the piston crown.

5. The offset crankshaft assembly of claim 1, wherein the piston is allowed an increased dwell time at distances closer to the cylinder head during a portion of the time between top dead center of the crankshaft rod journal and 90° crankshaft rotation after top dead center of the crankshaft rod journal when compared to the dwell profile of a single connecting rod assembly of similar length.

* * * * *